No. 735,820. Patented August 11, 1903.

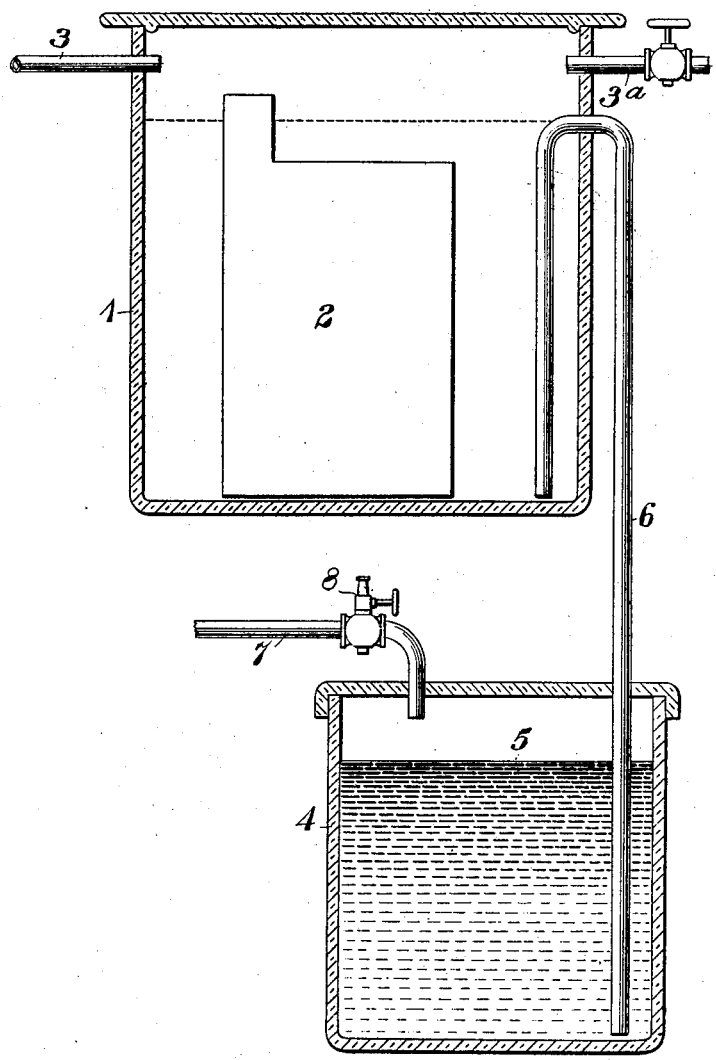

UNITED STATES PATENT OFFICE.

CHARLES J. REED, OF PHILADELPHIA, PENNSYLVANIA, ASSIGNOR TO SECURITY INVESTMENT COMPANY, A CORPORATION OF PENNSYLVANIA.

METHOD OF TREATING LEAD PLATES FOR USE IN SECONDARY BATTERIES.

SPECIFICATION forming part of Letters Patent No. 735,820, dated August 11, 1903.

Application filed February 1, 1902. Serial No. 92,135. (No specimens.)

*To all whom it may concern:*

Be it known that I, CHARLES J. REED, a citizen of the United States, residing at Philadelphia, in the county of Philadelphia and State of Pennsylvania, have invented a new and useful Improvement in Methods of Treating Lead Plates for Use in Secondary Batteries, of which the following is a specification.

My invention relates to the treatment of lead plates to form active material or material adapted to become active; and it has for its object to provide a method which will effect the formation of the active material or material adapted to become active more expeditiously and of greater depth than is possible by the methods heretofore usually employed.

In practicing my invention I first subject a metallic-lead plate of suitable form and dimensions to the action of a suitable acid in gaseous condition—such, for example, as hydrochloric-acid gas—in a closed chamber or receptacle, preferably in conjunction with an oxidizing agent—such, for example, as nitric acid, nitric oxid, nitric peroxid, chlorin, or bromin—thus producing a layer of lead chlorid.

While I prefer to employ an oxidizing agent in connection with gaseous hydrochloric acid for converting lead into lead chlorid on account of the more rapid conversion thus produced, a less rapid conversion may be effected by the hydrochloric-acid gas alone, which would be within the scope of my invention when considered in its broadest aspect.

In order to form the active material to be utilized in secondary batteries, I reduce the lead chlorid formed as above specified to spongy metallic lead either by electrochemical action or by the reducing action of metallic zinc or some other suitable reducing agent.

Instead of reducing the lead chlorid to spongy metallic lead it may be converted directly by electrochemical action into lead peroxid, which is also an active material for secondary batteries.

Means for practicing my invention are shown in the accompanying drawing, the single figure of which is a sectional view, partially diagrammatic in character, of the apparatus employed, the several parts of which will now be described.

The closed chamber or receptacle 1 is formed of glass or some other material which is not chemically attacked by the gases and liquids employed in the process, and in the chamber or receptacle is placed a lead plate 2, which, as above indicated, may be of such form and dimensions as will adapt it for use as a secondary-battery electrode. I introduce hydrochloric-acid gas into the receptacle 1 through a suitable tube or pipe 3 under sufficient pressure to fill the receptacle. This gas attacks the surface of the plate 2 and converts it into lead chlorid. In order to make the converting action more rapid, I prefer to employ an oxidizing agent—such, for example, as chlorin or one of the higher oxids of nitrogen—in conjunction with the hydrochloric-acid gas. The hydrochloric-acid gas may be mixed with the above-mentioned gaseous oxidizing agents before introduction into the chamber or receptacle, or the two gases may be introduced separately. I regard the former method as preferable, however. If the amount of gas in the receptacle 1 at any time exceeds what is desired, it may be drawn off through the pipe $3^a$. This pipe may also be utilized as an exit for air when the hydrochloric-acid gas is first introduced into the receptacle. I have found also that the formation of lead chlorid is greatly promoted by keeping the surface of the lead plate 2 in a moist condition, this condition being brought about either by submerging the plate in water or in a solution containing either hydrochloric acid or nitric acid. If water is employed, it soon becomes a solution of hydrochloric acid by reason of the absorption of a portion of the hydrochloric-acid gas. I find it advantageous to remoisten the plates as soon as they become dry through the action of the gases. The intervals between the applications of moistening liquid may vary from two to five hours, according to variations in the operating conditions.

For the purpose of supplying water or a solution for moistening the plate 2 I have shown a receptacle 4, containing a solution 5 of a suitable character and connected to the receptacle 1 by means of a siphon-tube 6. I may provide the receptacle 4 also with a pipe or tube 7, through which compressed air may be introduced into the receptacle. When the air is forced in through the pipe or tube 7, it obviously will force the liquid 5 through the pipe 6 into the receptacle 1, and after a sufficient amount of the liquid has been introduced into the receptacle 1 to moisten the plate 2 the compressed air may be withdrawn from the receptacle 4 through exit-tube and cock 8, and the liquid will then flow from the receptacle 1 into the receptacle 4 by the siphon action.

Instead of moistening the plate 2 by submerging it in water or an acid solution, as above indicated, it may be moistened by subjecting it to steam or other vapor containing moistening liquid in suspension. The oxidizing agent may also be introduced with the solution from the receptacle 4, if desired.

When the forming process has proceeded for such length of time as to produce a layer of lead chlorid upon the surface of the plate 3 of the desired depth, the plate may be removed and another substituted for it and subjected to the same treatment. It will also be understood that a plurality of plates may be treated at the same time, provided the receptacle is of proper dimensions and sufficient gas and liquid are employed for the purpose.

In order to convert the lead chlorid formed as above stated into active material for secondary batteries, I may place the plates in a solution of zinc chlorid in contact with metallic zinc and allow them to stand a few hours, the length of time depending upon the depth of the coating of lead chlorid, until the latter is reduced to spongy metallic lead, or I may reduce the lead chlorid to metallic lead electrochemically by making the chloridized plate the cathode in a solution of zinc chlorid, using an anode formed of lead, carbon, or other suitable conducting material, or I may convert the lead chlorid into lead peroxid by utilizing the plate as an anode in an electrochemical cell containing an electrolyte of dilute sulfuric acid.

I prefer to convert the chlorid of lead into spongy metallic lead by contact with zinc in a solution of zinc chlorid and to subsequently oxidize the positive plates by the ordinary process of charging after they have been assembled in the battery-cells.

Instead of treating metallic lead with hydrochloric-acid gas to form the corresponding haloid salt I may employ a hydrogen acid of any one of the other haloid elements—viz., bromin, iodin, and fluorin—in gaseous form, and thus secure a corresponding lead salt that may be subsequently reduced to either spongy metallic lead or lead peroxid in substantially the manner above described.

It is to be understood that the apparatus employed in practicing my method may be varied within wide limits and that the particular apparatus here illustrated and described is merely indicative of any suitable means for practicing the process.

I claim as my invention—

1. The process of converting metallic lead into lead chlorid, which consists in subjecting it to the action of hydrochloric-acid gas.

2. The process of converting metallic lead into lead chlorid, which consists in subjecting the lead in a moist condition to the action of hydrochloric-acid gas.

3. The process of converting metallic lead into lead chlorid, which consists in subjecting it to the joint action of hydrochloric-acid gas and an aqueous vapor.

4. The process of converting metallic lead into lead chlorid, which consists in subjecting it to the joint action of hydrochloric-acid gas and an oxidizing agent.

5. The process of converting metallic lead into lead chlorid, which consists in subjecting it to the joint action of hydrochloric-acid gas and an oxid of nitrogen.

6. The process of converting metallic lead into lead chlorid which consists in subjecting it, in a moist condition, to the joint action of hydrochloric-acid gas and an oxidizing agent.

7. The process of treating metallic-lead plates, which consists in subjecting them to hydrochloric-acid gas to form a lead chlorid and then converting the lead chlorid to spongy metallic lead.

8. The process of forming secondary-battery electrodes, which consists in subjecting lead plates to the action of hydrochloric-acid gas and an oxidizing agent to form lead chlorid and then reducing the lead chlorid to spongy metallic lead.

9. The process of forming secondary-battery electrodes, which consists in subjecting lead plates, in a moist condition, to hydrochloric-acid gas and an oxidizing agent to form lead chlorid and then reducing the lead chlorid to spongy metallic lead.

10. The process of converting metallic lead into a haloid salt, which consists in subjecting the lead to the joint action of a gaseous hydrogen compound, (or acid,) of a haloid element and an oxidizing agent.

11. The process of forming secondary-battery electrodes, which consists in subjecting lead plates, in a moist condition, to the joint action of an oxidizing agent and a gaseous compound of hydrogen with a haloid element to form a haloid salt of lead, and then reducing the haloid salt of lead to spongy metallic lead.

In testimony whereof I have hereunto subscribed my name this 30th day of January, 1902.

CHARLES J. REED.

Witnesses:
ROBT. B. FLETCHER,
THOMAS B. SMITH.